US008547362B2

(12) United States Patent
Liang et al.

(10) Patent No.: US 8,547,362 B2
(45) Date of Patent: Oct. 1, 2013

(54) STYLUS

(75) Inventors: Shi-Xu Liang, Shenzhen (CN);
Chung-Yeh Sa, Santa Clara, CA (US)

(73) Assignees: Shenzhen Futaihong Precision Industry Co., Ltd., Shenzhen (CN);
FIH (Hong Kong) Limited, Kowloon (HK)

( * ) Notice: Subject to any disclaimer, the term of this patent is extended or adjusted under 35 U.S.C. 154(b) by 535 days.

(21) Appl. No.: 12/854,268

(22) Filed: Aug. 11, 2010

(65) Prior Publication Data
US 2011/0242061 A1    Oct. 6, 2011

(30) Foreign Application Priority Data
Mar. 30, 2010    (CN) .......................... 2010 1 0135936

(51) Int. Cl.
*G06F 3/043*    (2006.01)

(52) U.S. Cl.
USPC ........................................ 345/179; 178/19.01

(58) Field of Classification Search
USPC ........................................ 345/179; 178/19.01
See application file for complete search history.

(56) References Cited

U.S. PATENT DOCUMENTS

| 7,310,091 | B2 | 12/2007 | Liu et al. | |
| 2002/0158854 | A1* | 10/2002 | Ju | 345/179 |
| 2005/0057535 | A1* | 3/2005 | Liu et al. | 345/179 |

FOREIGN PATENT DOCUMENTS

TW    M367374 U1    10/2009

* cited by examiner

*Primary Examiner* — Ariel Balaoing
(74) *Attorney, Agent, or Firm* — Altis & Wispro Law Group, Inc.

(57) ABSTRACT

A stylus includes a stylus barrel, a electrically conductive stylus head connecting to the stylus barrel, a rod assembly and a shaft. The rod assembly includes a swing block and an elastic member connecting the end of the swing block. The rod assembly is assembled in stylus barrel, the shaft is secured on the stylus barrel and passes through the swing block, making the swing block enable to tilt about the shaft, an end of the stylus head rotatably connects the other end of the swing block relative to the elastic member, the other end of the stylus head exposed to the stylus barrel, the elastic member provides an elastic force to cause the stylus head return to the original position after the stylus is moved into a tilted position.

14 Claims, 5 Drawing Sheets

STYLUS

BACKGROUND

1. Technical Field

The present disclosure relates to styluses, and particularly, to a stylus used in portable electronic devices.

2. Description of the Related Art

With the development of wireless communication and information processing technologies, portable electronic devices, such as mobile phones and personal digital assistants (PDAs), employing touch screens are now in widespread use. The styluses are commonly used for writing against the touch screen of the electronic device. Especially, condenser-type styluses are employed widespread, the condenser-type stylus needs to electronically conduct with body of user for forming an electronic field in the electronic device when using the stylus, making the electronic device enable to detect the writing signal of the stylus. However, the conventional condenser-type styluses associated with such devices are complicated in structure and therefore costly to manufacture.

Therefore, there is room for improvement within the art.

BRIEF DESCRIPTION OF THE DRAWINGS

Many aspects of the present stylus can be better understood with reference to the following drawings. The components in the drawings are not necessarily drawn to scale, the emphasis instead being placed upon clearly illustrating the principles of the present stylus. Moreover, in the drawings, like reference numerals designate corresponding parts throughout the several views.

DETAILED DESCRIPTION

Figure 1:
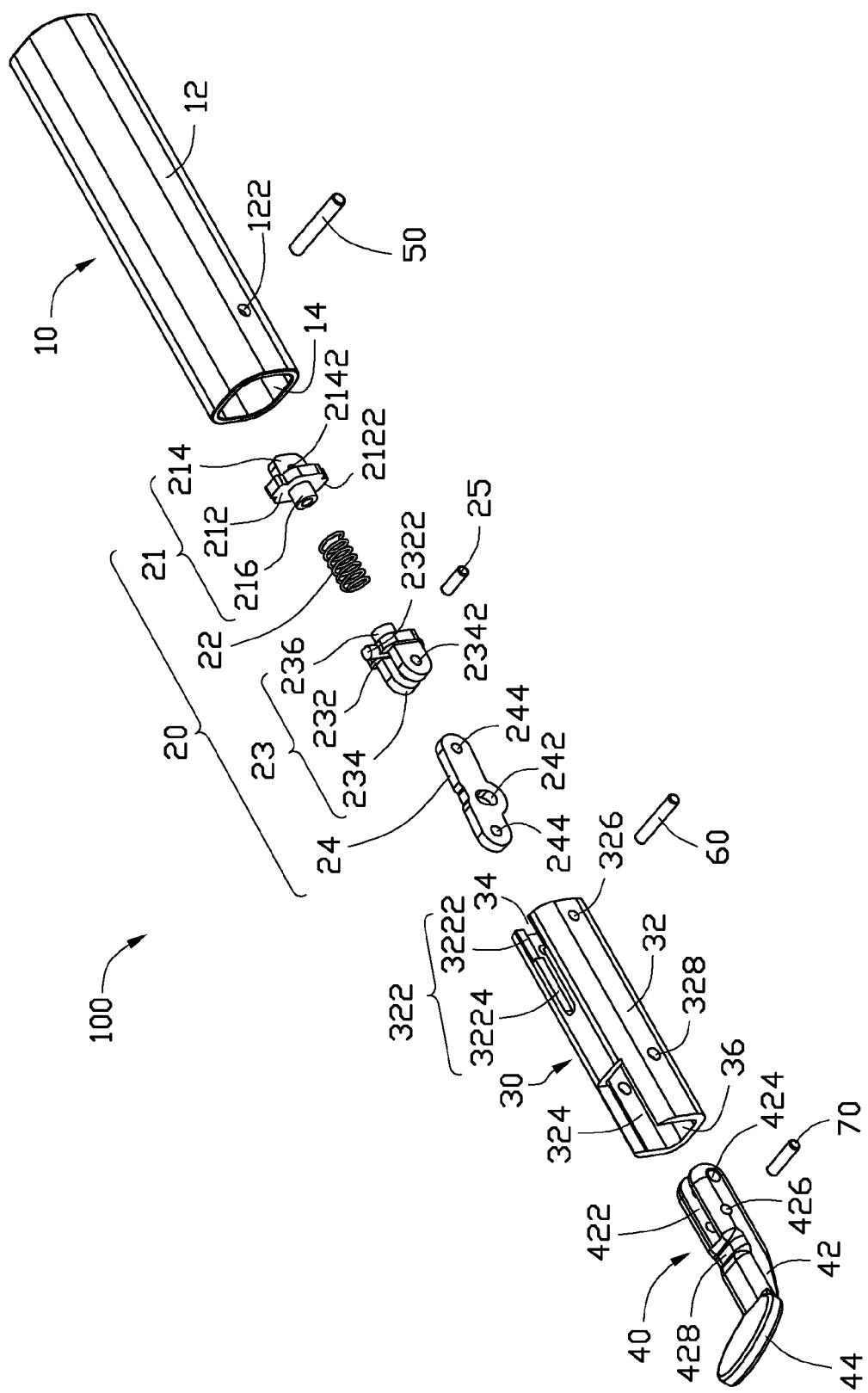
FIG. 1 is an exploded isometric view of an embodiment of a stylus.

FIG. 1 shows an exemplary embodiment of a stylus 100 used in a portable electronic device such as a mobile phone, or a personal digital assistant (PDA). The stylus 100 includes a stylus barrel 10, a rod assembly 20, a sleeve 30, a stylus head 40, a shaft 50 and several connecting pins. The rod assembly 20 and the stylus head 40 are assembled in the sleeve 30, and the sleeve 30 is assembled in the stylus barrel 10. The stylus head 40 is mechanically connected forming an electrically conductive connection with the stylus barrel 10 and an end of the stylus head 40 extends out of the stylus barrel 10, to make sure the stylus head 40 electrically conducting with the body of user when using.

Figure 4:
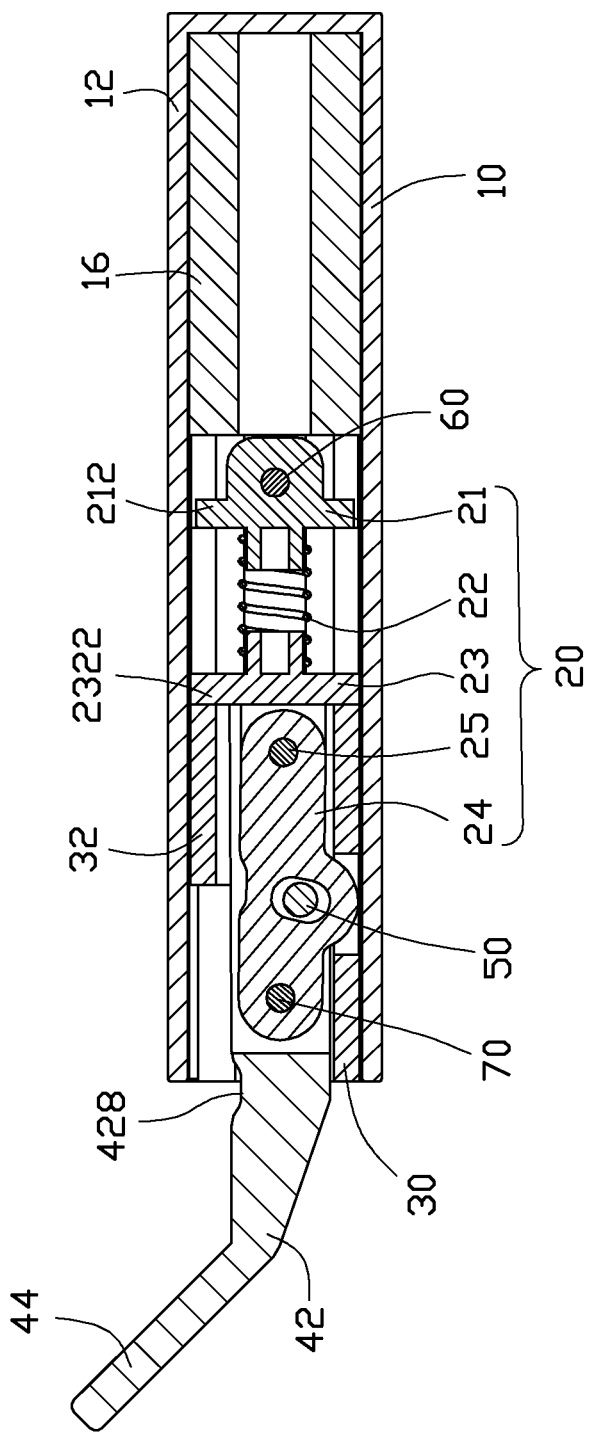
FIG. 4 is a cut-away view of the stylus shown in FIG. 3 along the direction IV-IV.

The stylus barrel 10 has an open end and an opposite closed end, and further includes a barrel wall 12, a receiving chamber 14 and a stop flange 16 (shown in FIG. 4). The stop flange 16 is annularly formed in the internal surface of the barrel wall 12, abutting the closed end. The barrel wall 12 radially defines a shaft hole 122, adjacent to the open end, passing through the opposite two sides of the barrel wall 12. The shaft hole 122 can receive the shaft 50 therein.

The rod assembly 20 includes a first connecting member 21, an elastic member 22, a second connecting member 23, and a swing block 24. The first connecting member 21 includes a first main plate 212, a first connecting plate 214 perpendicularly extending from one end surface of the first main plate 212, and a first connecting post 216 perpendicularly extending from the other end surface of the first main plate 212. The first main plate 212 forms two opposite latching flanges 2122 on the periphery thereof. The first connecting plate 214 has a first connecting hole 2142 defined therein. The first connecting post 216 is configured to engage with an end of the elastic member 22.

The elastic member 22 may be a coil-spring and can be displaced between the first connecting member 21 and the second connecting member 23 to provide an elastic force for the first connecting member 21 and the second connecting member 23.

The second connecting member 23 includes a second main plate 232, two parallel clamping plates 234 perpendicularly extending from an end surface of the second main plate 232, and a second connecting post 236 perpendicularly extending from an opposite end surface of the second main plate 232. The second main plate 232 has two opposite pillars 2322 protruding from the periphery. The two clamping plates 234 enclose a space (not labeled) for clamping an end of the swing block 24, and the two clamping plates 234 define two coaxially aligned second connecting holes 2342. The second connecting post 236 is positioned towards the first connecting post 216 and can engage the other end of elastic member 22.

The swing block 24 defines a middle hole 242 and two end holes 244. The middle hole 242 is defined at the center of the swing block 24, and is generally rectangular and facilitates the shaft 50 to pass through. The middle hole 242 can be a guiding hole and the shaft 50 can slide along the sidewall of the middle hole 242. Each end holes 244, adjacent to an end of the swing block 24, enables the swing block 24 to connect with the second connecting member 23 and the stylus head 40.

The sleeve 30, may be tube shaped with two ends of which can slidably surround the rod assembly 20 and stylus head 40 including a peripheral wall 32, a first opening end 34 at one end and a second opening end 36 at the opposite end. The peripheral wall 32 defines two latching grooves 322, abutting on the first opening end 34, oppositely located at two sides of the peripheral wall 32. Each latching groove 322 axially extends toward to the second opening end 36, the latching groove 322 is in a stepped shape and includes a first latching section 3222 and a second latching section 3224. The first latching section 3222 interconnects the first opening end 34 and is wider than the second latching section 3224. The first latching section 3222 has substantially the same width as the latching flange 2122, and can receive the latching flange 2122 sliding along the first latching section 3222. The second latching section 3224 has substantially the same width as the diameter of the pillar 2322, and can receive the pillar 2322 sliding along the second latching section 3224. The peripheral wall 32 defines a cutout 324 at the opposite other end, interconnecting the second opening end 36 and for providing a space where the stylus head 40 rotates. The peripheral wall 32 radially defines a first fixing hole 326 and a second fixing hole 328. The first fixing hole 326 is positioned adjacent to the first opening end 34 and connects to the first connecting member 21. The second fixing hole 328 is positioned adjacent to the second opening end 36 and is used to connect the stylus head 40 to the sleeve 30.

The stylus head 40 includes a bar portion 42 and a tip portion 44 formed at an end of the bar portion 42. The bar portion 42 can be inserted into the inside of the sleeve 30 from the second opening end 36 and rotatably connects with the sleeve 30. The bar portion 42 axially defines a slot 422 for receiving the other end of the swing block 24. The bar portion 42 radially defines a first engaging hole 424 and a second engaging hole 426. The first engaging hole 424 is adjacent to the outer end of the bar portion 42 and allows the shaft 50 to pass through. The second engaging hole 426, positioned adjacent to the middle of the bar portion 42, is used for connecting the swing block 24 with the stylus head 40. The bar portion 42 can define a depression 428 at the sidewall for a rotation of the stylus head 40. The tip portion 44 is generally a disk-shaped and connects with the bar portion 42 at an obtuse angle, and the tip portion 44 is for manipulation of a touch screen of an electronic device.

Figure 2:
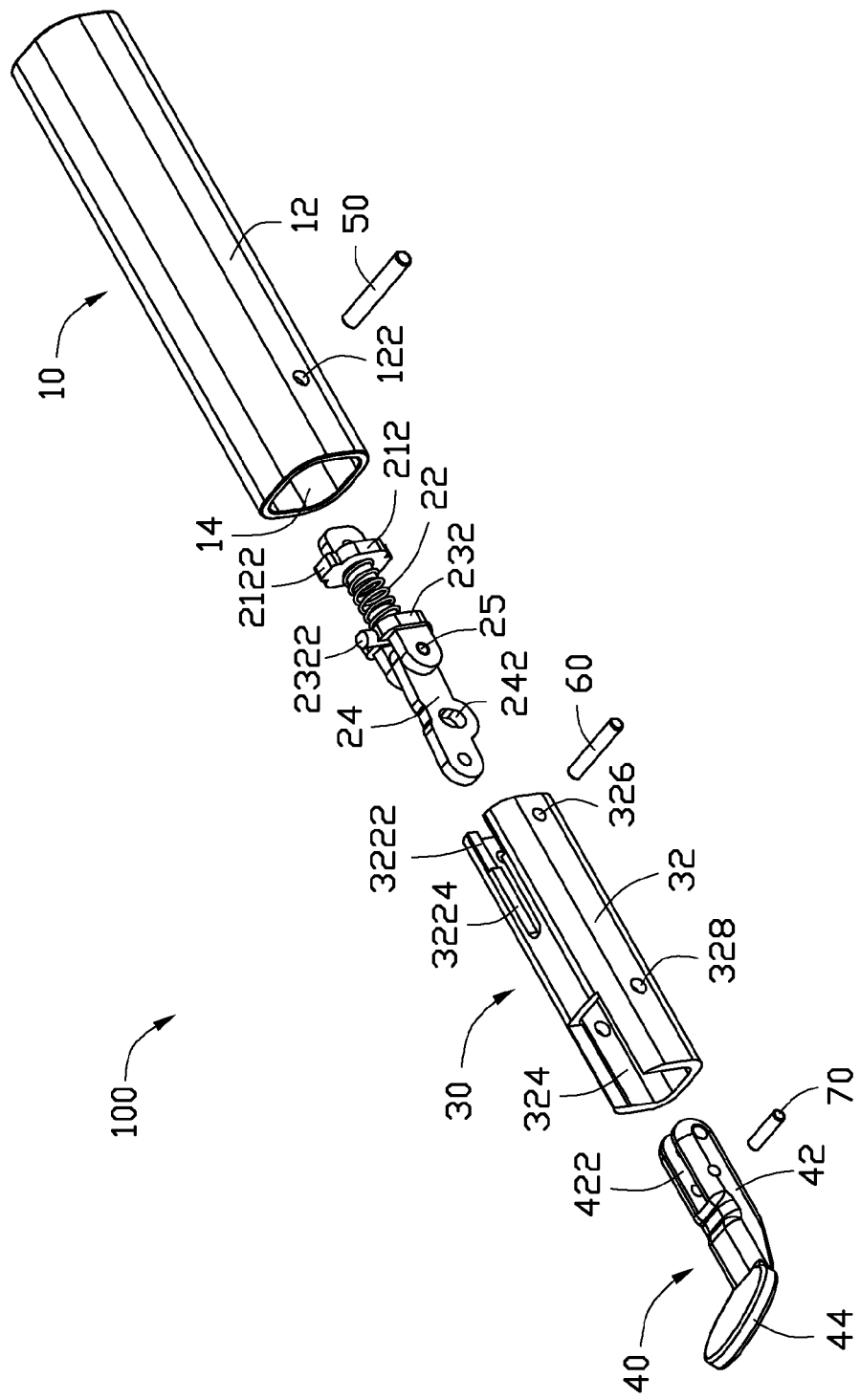
FIG. 2 is an isometric view of the stylus shown in FIG. 1 in assembling.

Referring to FIG. 2, to assemble the stylus 100, the rod assembly 20 is assembled. During this process, one end of the swing block 24 connects to the second connecting member 23. The end of the swing block 24 extends into the space between the two clamping plates 234. The end hole 244 aligns with the two second connecting holes 2342. The first connecting pin 25 passes through the second connecting holes 2342 and the end hole 244 to rotatably connect the swing block 24 with the second connecting member 23. Then, the two ends of the elastic member 22 respectively engage with the first connecting post 216 and the second connecting post 236, so the rod assembly 20 is assembled substantially.

Figure 3:
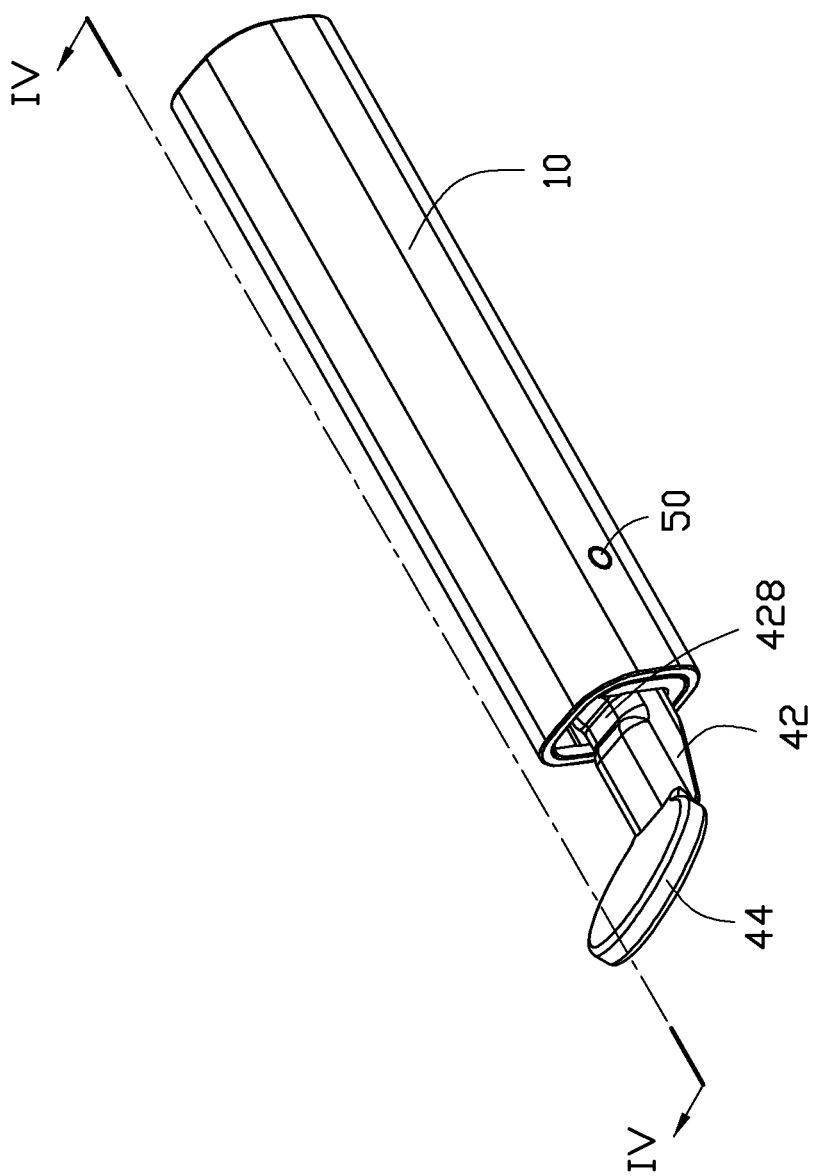
FIG. 3 is an integral, assembled isometric view of the stylus shown in FIG. 1.

Referring to FIGS. 3 and 4, the rod assembly 20 is positioned into the sleeve 30 for assembly. The swing block 24 extends into the sleeve 30 from the first opening end 34, the second main plate 232 is received in the sleeve 30 and the pillars 2322 slide along the second latching sections 3224 until the pillars 2322 resist against the bottom of the second latching section 3224. The first main plate 212 is received in the sleeve 30 and the latching flanges 2122 slide along the first latching sections 3222 until the latching flanges 2122 abuts against the bottom of the first latching sections 3222. At the same time, the first connecting hole 2142 aligns with the first fixing hole 326. A second connecting pin 60 passes through the first fixing hole 326 and the first connecting hole 2142 to securely connect the first connecting member 21 to the sleeve 30. The elastic member 22 is compressed between the first connecting member 21 and the second connecting member 23. An end of the swing block 24 extends to abut to the second opening end 36.

Then, the bar portion 42 of the stylus head 40 is inserted into the sleeve 30 from the second opening end 36, and the slot 422 of the bar portion 42 receives one end of the swing block 24. The second engaging hole 426 aligns with the end hole 244 of the swing block 24. A third connecting pin 70 passes through the second engaging hole 426 and the end hole 244 to rotatably connect the swing block 24 with the stylus head 40. At the case, the first engaging hole 424 aligns with the middle hole 242 of the swing block 24.

The sleeve 30 is mounted into the receiving chamber 14 of the stylus barrel 10 until the first opening end 34 of the sleeve 30 resists against the stop flange 16. At this time, the shaft hole 122 of the stylus barrel 10, the middle hole 242, the second fixing hole 328 and the first engaging hole 424 aligns with each other in the written order. The shaft 50 is assembled, by passing through the shaft hole 122 of the stylus barrel 10, the middle hole 242, the second fixing hole 328 and then the first engaging hole 424. Then, the sleeve 30 is secured in the stylus barrel 10, while the stylus head 40 can rotate about the shaft 50, and the tip portion 44 of the stylus head 40 is exposed relative to the stylus barrel 10. Accordingly, the stylus 100 is assembled.

Figure 5:
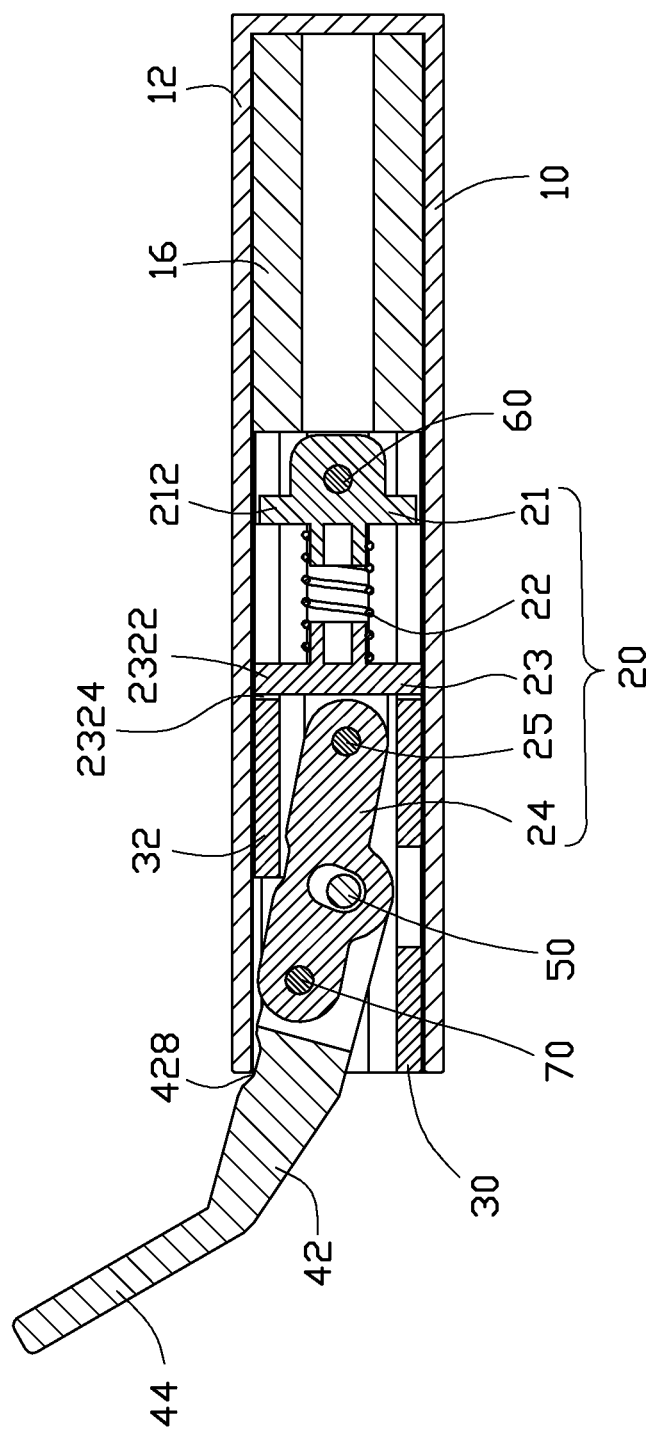
FIG. 5 is a cut-away view of the stylus shown in FIG. 3, when the stylus is in use.

Referring to FIG. 5, in use of the stylus 100, the stylus head 40 flexes as it is pressed by an external force against the writing surface of the electronic device to maintain a more constant pressure against the writing surface of the electronic device. The bar portion 42 tilts at a pivot point relative to the shaft 50 until the bottom of the depression 428 resists against the end wall of stylus barrel 10. The swing block 24 tilts at a pivot point relative to the second connecting pin 60 at a corresponding angle. At the same time, the swing block 24 axially moves toward to the second connecting member 23, with the shaft 50 sliding from one end to the other end of the middle hole 242. Thus, the swing block 24 resists against the second connecting member 23, the pillars 2322 slide along the second latching sections 3224 to form a gap 2324. The elastic member 22 is completely compressed. After the stylus head 40 is released, the elastic member 22 resists against the second connecting member 23, the swing block 24 rotates and the bar portion 42 rotates correspondingly, and the stylus head 40 returns to the original state.

To make the stylus head 40 conductive, the stylus barrel 10, the sleeve 30 and the stylus head 40 should be made of electrically conductive materials.

It is to be understood that even though numerous characteristics and advantages of the present embodiments have been set forth in the foregoing description, together with details of assemblies and functions of various embodiments, the disclosure is illustrative only, and changes may be made in detail, especially in matters of shape, size, and arrangement of parts within the principles of the present invention to the full extent indicated by the broad general meaning of the terms in which the appended claims are expressed.

What is claimed is:

1. A stylus, comprising:
a stylus barrel;
a stylus head mechanically connected to and forming an electrically conductive connection with the stylus barrel;
a rod assembly assembled in the stylus barrel, the rod assembly including a swing block and an elastic member connecting to an end of the swing block, the middle of the swing block defining a middle hole; and
a shaft secured on the stylus barrel and passing through the middle hole; wherein:
an end of the stylus head rotatably connects to the other end of the swing block, the other end of the stylus head exposed from the stylus barrel, the elastic member provides an elastic force to cause the stylus head to return to the original position when the stylus is tilted.

2. The stylus as claimed in claim 1, wherein the rod assembly includes a first connecting member and a second connecting member, the elastic member resists between the first connecting member and the second connecting member, the swing block connects to the elastic member by the second connecting member.

3. The stylus as claimed in claim 2, wherein the stylus includes a sleeve, an end of the sleeve defines axially a latching groove, the latching groove includes a first latching section for resisting against the first connecting member, and a second latching section for resisting against the second connecting member.

4. The stylus as claimed in claim 3, wherein the first connecting member includes a first main plate forming latching flanges to engage with the first latching section.

5. The stylus as claimed in claim 4, wherein the first connecting member includes a first connecting plate connecting to the first main plate, the first connecting plate defines a first connecting hole, the sleeve defines a first fixing hole, a first connecting pin passes through the first connecting hole and the first fixing hole to connect the first connecting member to the sleeve.

6. The stylus as claimed in claim 3, wherein the second connecting member includes a second main plate, the second main plate protrudes pillars to engage with the second latching section.

7. The stylus as claimed in claim 6, wherein the second main plate has two parallel clamping plates formed thereon, the two clamping plates respectively defines coaxially a second connecting hole, the swing block defines two end holes at two ends, an end of the swing block extends and clamped between the two clamping plates, a second connecting pin passes through the second connecting hole and the end hole to connect the second connecting member to the swing block.

8. The stylus as claimed in claim 3, wherein the shaft is slidably assembled in the middle hole.

9. The stylus as claimed in claim 8, wherein the stylus head includes a bar portion and a tip portion at an end of the bar portion, the bar portion defines a slot to receive on end of the swing block.

10. The stylus as claimed in claim 9, wherein the bar portion defines a first engaging hole, the sleeve defines a second fixing hole, the stylus barrel defines a shaft hole, the shaft passes through the shaft hole, the second fixing hole, the first engaging hole and the middle hole, to rotatably connect the shaft, the stylus head and the stylus barrel together.

11. The stylus as claimed in claim 9, wherein the bar portion defines a second engaging hole, one end of the swing block extends into the slot, a third connecting pin passes through the second engaging hole and the end hole to rotatably connect the swing block with the stylus head.

12. A stylus, comprising:
a stylus barrel;
a stylus head electronically and rotatably connecting to the stylus barrel;
a shaft secured on the stylus barrel and passing through the stylus head; and
a rod assembly assembled in the stylus barrel and disposed between the stylus barrel and the stylus head, the rod assembly being configured for enabling the stylus head to return to an original position after an external force on the stylus is removed, wherein the rod assembly includes a swing block and an elastic member resisted between the swing block and the housing, one end of the stylus head is rotatably connected to the swing block, the elastic member providing an elastic force to cause the stylus head return to an original position.

13. The stylus as claimed in claim 12, wherein the stylus further includes a sleeve, the rod assembly is assembled in sleeve, the sleeve is assembled in the stylus barrel.

14. The stylus as claimed in claim 12, wherein the middle of the swing block defining a middle hole, the shaft passes through the middle hole and slides along the sidewall of the middle hole.

* * * * *